US011300391B2

(12) United States Patent
Vaquer Tarrago et al.

(10) Patent No.: US 11,300,391 B2
(45) Date of Patent: *Apr. 12, 2022

(54) ARCHERY PROJECTILE FACILITY (71) Applicant: Archery Intelligence, LLC, Stamford, CT (US)

(72) Inventors: Jordi Vaquer Tarrago, Tarragona (ES); Josep Lluis Vaquer Tarrago, Tarragona (ES); Joan de Magrina Calaf, Tarragona (ES)

(73) Assignee: ARCHERY INTELLIGENCE, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,241

(22) Filed: Jul. 24, 2020

(65) Prior Publication Data
US 2020/0355475 A1 Nov. 12, 2020

Related U.S. Application Data (63) Continuation of application No. 16/198,490, filed on Nov. 21, 2018, now Pat. No. 10,760,883.
(Continued)

(51) Int. Cl.
*F42B 12/38* (2006.01)
*F42B 6/08* (2006.01)
(Continued)

(52) U.S. Cl.
CPC .............. *F42B 12/385* (2013.01); *F41B 5/14* (2013.01); *F42B 6/04* (2013.01); *F42B 6/08* (2013.01);
(Continued)

(58) Field of Classification Search
None
See application file for complete search history.

(56) References Cited

U.S. PATENT DOCUMENTS 5,902,199 A * 5/1999 Adams, Jr. ............... F42B 6/04
473/578
5,971,875 A * 10/1999 Hill .......................... F42B 6/06
473/578
(Continued)

FOREIGN PATENT DOCUMENTS

WO 2017112778 A1 6/2017

OTHER PUBLICATIONS

Barton et al., "Arrow-mounted Ballistic System for Measuring Performance of Arrows Equipped with Hunting Broadheads", Elsevier Science Direct, Mar. 5, 2012, 9th conference of the International Sports Engineering Association, pp. 455-450.

*Primary Examiner* — Jason T Yen
(74) *Attorney, Agent, or Firm* — Bennet K. Langlotz; Langlotz Patent & Trademark Works, LLC (57) ABSTRACT An archery projectile facility comprises an elongated body. The elongated body includes at least one accelerometer. The at least one accelerometer is operable to generate three-dimensional acceleration information. The archery projectile facility comprises a body processor. The body processor is operably connected to the at least one accelerometer. The body processor is adapted to process the three-dimensional acceleration information to generate sampled information. The archery projectile facility comprises a transmitter. The transmitter is operably connected to the body processor to broadcast the sampled information. The archery projectile facility comprises a receiver. The receiver includes a receiver processor. The receiver processor is adapted to generate resulting information based on the sampled information. The resulting information is based on a determination of a stabilization point.

20 Claims, 9 Drawing Sheets

Related U.S. Application Data (60) Provisional application No. 62/621,089, filed on Jan. 24, 2018.

(51) Int. Cl.
*F41B 5/14* (2006.01)
*F42B 6/04* (2006.01)
*F42B 12/36* (2006.01)
*F42B 15/08* (2006.01)
*G01P 3/66* (2006.01)
*G01P 15/18* (2013.01)

(52) U.S. Cl.
CPC .......... *F42B 12/362* (2013.01); *F42B 12/365* (2013.01); *F42B 12/382* (2013.01); *F42B 15/08* (2013.01); *G01P 3/665* (2013.01); *G01P 15/18* (2013.01)

(56) References Cited

U.S. PATENT DOCUMENTS

| | | |
|---|---|---|
| 8,449,414 B2 | 5/2013 | Donahoe et al. |
| 8,733,168 B2 | 5/2014 | Donahoe et al. |
| 9,500,452 B1 | 11/2016 | Donahoe et al. |
| 2008/0176681 A1* | 7/2008 | Donahoe ................. F41B 5/148 473/570 |
| 2011/0202152 A1 | 8/2011 | Barton et al. |
| 2012/0035006 A1* | 2/2012 | Bay ........................... F42B 6/08 473/570 |
| 2014/0100066 A1 | 4/2014 | Roman |
| 2015/0237239 A1 | 8/2015 | Lyren et al. |
| 2016/0169929 A1* | 6/2016 | Donahoe ................. G01D 21/02 702/149 |
| 2016/0187113 A1 | 6/2016 | Donahoe |
| 2018/0172388 A1 | 6/2018 | Haynes et al. |

\* cited by examiner

$$s = \begin{pmatrix} s[1] & s[M-L] & \cdots & s[N_t - 2M + L] & s[N_t - M] \\ s[2] & \ddots & \cdots & & s[N_t - M + 1] \\ \vdots & & \ddots & & \vdots \\ s[M-1] & s[2M-L-1] & \cdots & & s[N_t - 1] \\ s[M] & s[2M-L] & \cdots & s[N_t - M + L] & s[N_t] \end{pmatrix}$$

$$T_f = \frac{1}{\sqrt{M}} \begin{pmatrix} 1 & 1 & 1 & 1 & \cdots & 1 \\ 1 & W & W^2 & W^3 & \cdots & W^{M-1} \\ 1 & W^2 & W^4 & W^6 & \cdots & W^{2(M-1)} \\ 1 & W^3 & W^6 & W^9 & \cdots & W^{3(M-1)} \\ \vdots & \vdots & \vdots & \vdots & \ddots & \vdots \\ 1 & W^{M-1} & W^{2(M-1)} & W^{3(M-1)} & \cdots & W^{(M-1)(M-1)} \end{pmatrix}$$

$$v[n] = (v_x[n], v_y[n], v_z[n]) = \left( \sum_{k=1}^{n} a_x[k] - v_{x0}, \sum_{k=1}^{n} a_y[k] - v_{y0}, \sum_{k=1}^{n} a_z[k] - v_{z0} \right)$$

$$|v[n]| = \sqrt{v_x^2[n] + v_y^2[n] + v_z^2[n]}$$

$$\frac{(E_{kT2})}{(E_k)} = \frac{m(|v[n]|^2)_{T2}}{m(|v[n]|^2)} = \frac{(|v[n]|^2)_{T2}}{(|v[n]|^2)}$$

$$A = \begin{pmatrix} a[1] & a[M-L] & \cdots & a[N_t - 2M + L] & a[N_t - M] \\ a[2] & \ddots & \cdots & & a[N_t - M + 1] \\ \vdots & & \vdots & & \vdots \\ a[M-1] & a[2M-L-1] & \cdots & \ddots & a[N_t - 1] \\ a[M] & a[2M-L] & \cdots & a[N_t - M + L] & a[N_t] \end{pmatrix}$$

ARCHERY PROJECTILE FACILITY

CROSS-REFERENCE TO RELATED APPLICATION

This application is a Continuation of U.S. patent application Ser. No. 16/198,490 filed on Nov. 21, 2018, entitled "ARCHERY PROJECTILE FACILITY," which claims the benefit of U.S. Provisional Application No. 62/621,089, filed Jan. 24, 2018, which are hereby incorporated by reference in their entirety.

FIELD OF THE PRESENT DISCLOSURE

The present disclosure generally relates to archery projectiles. More particularly, the present disclosure relates to determining the stabilization point of an archery projectile after a flight has been initiated.

BACKGROUND OF THE PRESENT DISCLOSURE

Many existing archery projectile measurement systems may not be adapted easily to a plurality of third-party arrow shafts and/or a plurality of third-party broadheads. Employment of many existing archery projectile measurement systems may negatively impact the trajectory of archery projectiles during flight.

Many existing archery projectile measurement systems rely on accelerometer data in one dimension. Many existing archery projectile measurement systems comprise accelerometers that become saturated during launch. Many existing archery projectile measurement systems comprise accelerometers that become saturated upon impact with a target. Many existing archery projectile measurement systems average accelerometer data. Many existing archery projectile measurement systems produce results based on approximate values. Many existing archery projectile measurement systems do not produce enough high resolution accelerometer data to determine a reliable stabilization point during flight.

Many existing archery projectile measurement systems determine arrow vibration by performing frequency analysis directly on recorded accelerometer data. Many existing archery projectile measurement systems fail to account for changing conditions during distinct phases of flight (for example, from launch to stabilization, and from stabilization to impact).

What is needed is an improved archery projectile facility.

SUMMARY OF THE PRESENT DISCLOSURE

At least some embodiments of the present disclosure provide an archery projectile facility. The archery projectile facility comprises an elongated body. The elongated body includes at least one accelerometer. The at least one accelerometer is operable to generate three-dimensional acceleration information. The archery projectile facility comprises a body processor. The body processor is operably connected to the at least one accelerometer. The body processor is adapted to process the three-dimensional acceleration information to generate sampled information. The archery projectile facility comprises a transmitter. The transmitter is operably connected to the body processor to broadcast the sampled information. The archery projectile facility comprises a receiver. The receiver includes a receiver processor. The receiver processor is adapted to generate resulting information based on the sampled information. The resulting information is based on a determination of a stabilization point.

The elongated body may be adapted to be removably received in a hollow bore of an elongated arrow shaft.

The elongated body may be adapted to be removably received in a rear end portion of the hollow bore proximate a nock.

The at least one accelerometer may be adapted to detect cyclical flexure of the elongated arrow shaft.

The at least one accelerometer may be a three-axis transducer.

The resulting information may further include velocity information.

The resulting information may further include distance information.

The resulting information may further include angle information.

The resulting information may further include a trauma score.

The at least one accelerometer may be adapted to detect rotation about a body axis defined by the elongated body.

The transmitter may be adapted to transmit a plurality of sequential packets of the sampled information during a flight of the elongated body.

The three-dimensional acceleration information may be generated at a rate ranging between 50 and 3200 times per second.

The receiver processor may be adapted to generate a first set of resulting information reflecting the sampled information over a first time period of flight. The receiver processor may be adapted to generate a second set of resulting information reflecting the sampled information over a second time period of flight. The first set of resulting information may be distinct from the second set of resulting information.

The first set of resulting information may be generated for sampled information prior to the stabilization point. The second set of resulting information may be generated for sampled information after the stabilization point.

The receiver may include a storage facility including stored data. The receiver processor may be adapted to generate performance information based on the resulting information and based on the stored data.

The stored data may include arrow shaft mass for a plurality of arrow shafts. The stored data may include fletching mass for a plurality of fletchings. The stored data may include arrow tip mass for a plurality of arrow tips.

The performance information may include kinetic energy delivered to a target.

The resulting information may include a time interval until the stabilization point.

The resulting information may include a flight distance until the stabilization point.

DETAILED DESCRIPTION

Embodiments of the present disclosure now will be described more fully hereinafter with reference to the accompanying drawings, in which embodiments of the present disclosure are shown. This present disclosure may, however, be embodied in many different forms and should not be construed as limited to the embodiments set forth herein; rather, these embodiments are provided so that this disclosure will be thorough and complete, and will fully convey the scope of the present disclosure.

Certain embodiments of the present disclosure provide an archery projectile facility. For the purposes of this disclosure, archery projectiles may include but are not limited to arrows and bolts.

At least some embodiments of the present disclosure provide specific information related to measurements of an archery projectile during flight. Employment of the specific information may increase the likelihood of accurately determining flight information. Employment of the specific information may increase the likelihood of successfully determining at least a portion of the flight information based on the stabilization point of the archery projectile during flight. Knowledge of the flight information may be employed by archers seeking to understand how their equipment and or technique effects flight dynamics of the archery projectile. Knowledge of the flight information may be employed by archery equipment manufacturers and/or dealers seeking to assist archers in equipment selection, equipment setup, and/or technique adjustments. In the present disclosure, the flight information may include resulting information and/or performance information.

According to an embodiment, an archery projectile facility may comprise an elongated body. The elongated body may include at least one accelerometer. The at least one accelerometer may be operable to generate three-dimensional acceleration information. The archery projectile facility may comprise a body processor. The body processor may be operably connected to the at least one accelerometer. The body processor may be adapted to process the three-dimensional acceleration information to generate sampled information. Processing the three-dimensional acceleration information may comprise multiplying the three-dimensional acceleration information by the standard gravity g. Processing the three-dimensional acceleration information may comprise multiplying the three-dimensional acceleration information by the range of the corresponding accelerometer. Processing the three-dimensional acceleration information may comprise dividing the three-dimensional acceleration information by 2 to the power of the number of bits of the corresponding accelerometer. Processing the three-dimensional acceleration information may comprise applying a FIR filter to X axis acceleration components. The FIR filter may employ windowing. Examples of windowing include the Hanning Window, the Hamming Window, and the Blackman window. The FIR filter may, for example, comprise an order of 33. The FIR filter may, for example, comprise a cutoff frequency of 20 Hz. The archery projectile facility may comprise a transmitter. The transmitter may be operably connected to the body processor to broadcast the sampled information. The transmitter may be adapted to transmit a plurality of sequential packets of the sampled information during a flight of the elongated body. The transmitter may be adapted to transmit at least a portion of the sampled information after an impact has been detected. The archery projectile facility may comprise a receiver. The receiver may include a receiver processor. The receiver processor may be adapted to generate resulting information based on the sampled information. The resulting information may be based on a determination of a stabilization point.

According to an embodiment, an elongated body may be adapted to be removably received in a hollow bore of an elongated arrow shaft. The elongated body may be adapted to be removably received in a rear end portion of the hollow bore proximate a nock.

Figure 1:
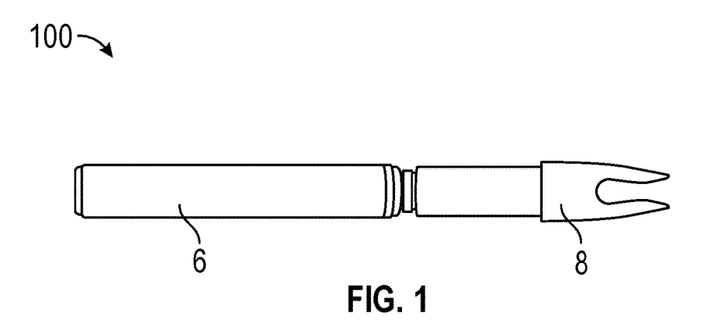
FIG. 1 illustrates an example archery projectile facility according to an aspect of an embodiment.

FIG. 1 illustrates an example archery projectile facility 100 according to an aspect of an embodiment. The archery projectile facility 100 may comprise an elongated body. The archery projectile facility 100 may comprise an energy storage device. The elongated body and/or the energy storage device may be at least partially surrounded by a protective seal 6. The archery projectile facility 100 may comprise a nock 8.

Figure 2:
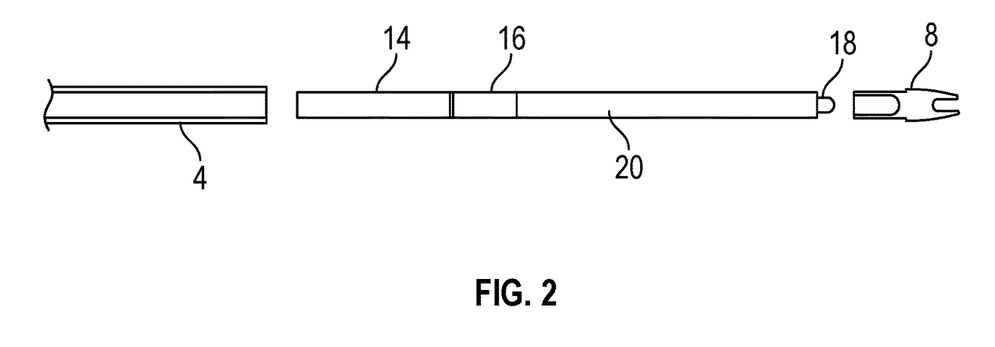
FIG. 2 illustrates an example archery projectile facility with an optional example hollow arrow shaft according to an aspect of an embodiment.

FIG. 2 illustrates an example archery projectile facility with an optional example elongated arrow shaft 4 according to an aspect of an embodiment. The archery projectile facility may comprise an elongated body 20. The elongated body 20 may be removably received in a hollow bore of the elongated arrow shaft 4. The elongated body 20 may be removably received in a rear end portion of the hollow bore of the elongated arrow shaft 4. The archery projectile facility may include a nock 8. The nock 8 may be adapted to connect to the rear end portion of the hollow arrow shaft 4 by way of a slip fit. The archery projectile facility may include an energy storage device 14 connected to the elongated body 20. The energy storage device 14 and/or the elongated body 20 may be coated in water resistant material (e.g. resin). The archery projectile facility may include a wireless charging coil 16. The elongated body 20 may comprise at least one Light Emitting Diode (LED) 18. The at least one LED 18 may be activated upon detection of a flight state and/or a detection of impact.

According to an embodiment, a width of an elongated body (e.g. 20) may be less than or equal to 4.5 mm. A length of the elongated body (e.g. 20) may be less than or equal to 120 mm. The weight of the elongated body (e.g. 20) may be less than 40 grains. An energy storage device (e.g. 14) may comprise a pin-shaped battery. The battery may be rechargeable. The battery may comprise Lithium Ion. A diameter of the energy storage device (e.g. 14) may be less than or equal to 3.65 mm. The weight of the energy storage device (e.g. 14) may be less than or equal to 0.5 grains.

According to an embodiment, an elongated body may include a signal designator. The signal designator may be presented or communicated in a variety of ways. Examples include but are not limited to: a barcode, a Quick Reference (QR) code, an alpha-numeric code, a Radio-frequency Identification (RFID) tag, a Near-field Communication (NFC) device, combinations thereof, and/or the like. A distinct signal designator may be included for each of a plurality of elongated bodies (e.g. 20) so that each of the plurality of elongated bodies (e.g. 20) may be distinguished from each other.

According to an embodiment, a receiver may include a storage facility. The receiver may be configured to communicate with a storage facility through employment of a data network (for example, the Internet and/or a Local Area Network). The storage facility may include stored data. A receiver processor may be adapted to generate performance information. The performance information may be based on resulting information. The performance information may be based on the stored data. The stored data may include arrow shaft mass for a plurality of arrow shafts. The stored data may include arrow spine rating for a plurality of arrow shafts. The stored data may include arrow shaft diameter for a plurality of arrow shafts. The stored data may include fletching mass for a plurality of fletchings. The stored data may include a plurality of fletching turn arrangements. The stored data may include a plurality of fletching lengths. The stored data may include a plurality of fletching heights. The stored data may include arrow tip mass for a plurality of arrow tips and/or broadheads. The stored data may include a blade count for a plurality of broadheads. The stored data may include blade size for a plurality of broadheads. The performance information may include kinetic energy delivered to a target. The performance information may include kinetic energy at a specific time during flight. The performance information may include kinetic energy at a specific distance during flight. The performance information may include ballistic information. The performance information may include a ballistic curve. The ballistic curve may be three dimensional. The performance information may include momentum delivered to a target. The performance information may include momentum at a specific time during flight. The performance information may include momentum at a specific distance during flight. The performance information may include impact on target. The impact on target may be expressed in pounds of force per square inch. The performance information may include a flight score. The flight score may comprise a ratio of kinetic energy lost to the total kinetic energy at launch. The kinetic energy lost may be calculated at or near a stabilization point. The flight score may be expressed as a percentage or a fraction. The flight score may be expressed as a rating in a range of 0-10.

Figure 3:
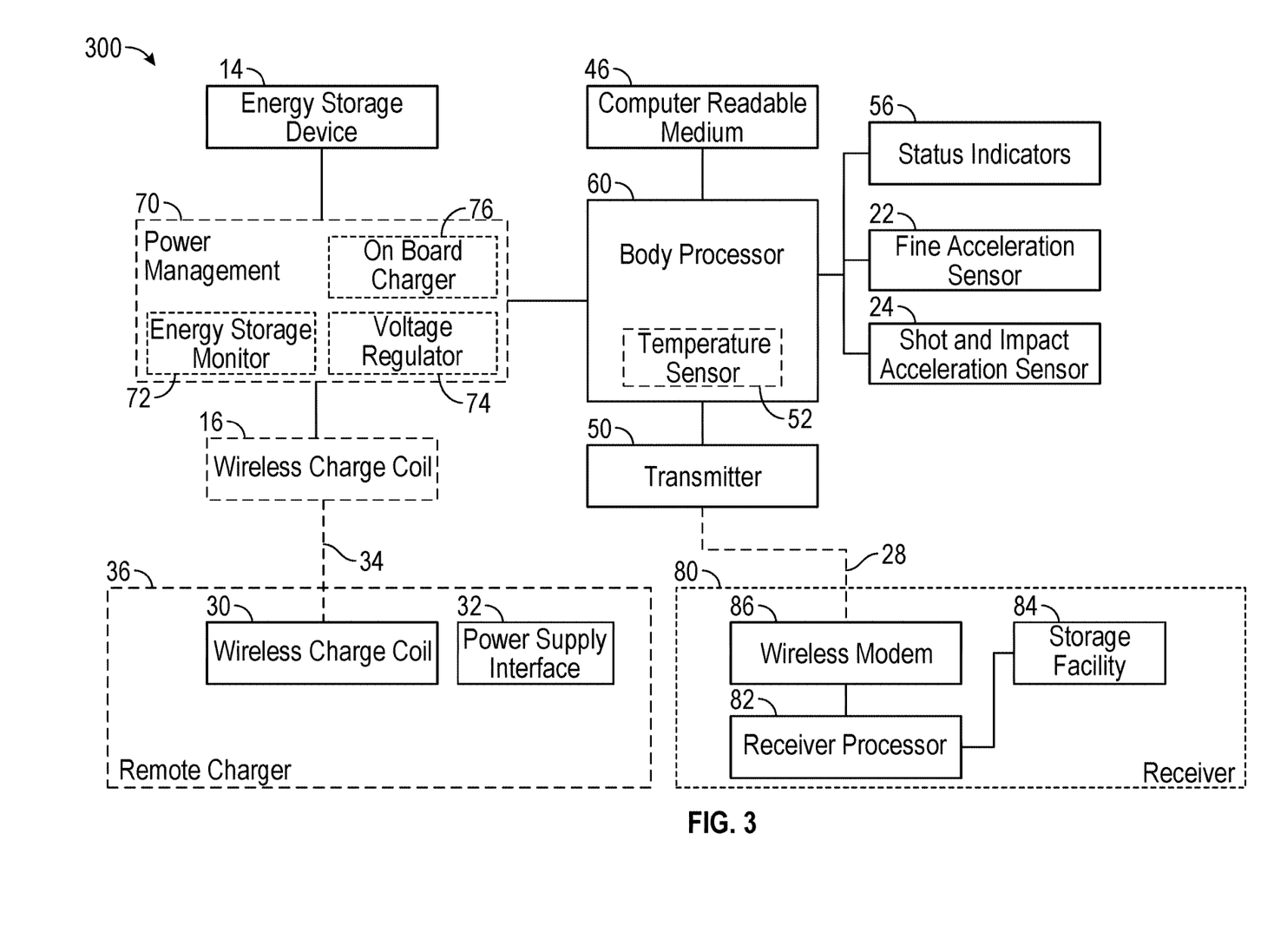
FIG. 3 is a block diagram showing an example archery projectile facility as per an aspect of an embodiment.

FIG. 3 is a block diagram showing an example archery projectile facility 300 as per an aspect of an embodiment. The archery projectile facility 300 may comprise a body processor 60. The body processor 60 may comprise a temperature sensor 52. The archery projectile facility 300 may comprise a transmitter 50. The transmitter 50 may be in communication with the body processor 60. The archery projectile facility 300 may comprise at least one accelerometer. The at least one accelerometer may comprise at least one digital Microelectromechanical Systems (MEMS) accelerometer. The at least one accelerometer may be operable to generate three-dimensional acceleration information at a rate of, for example, 3200 times per second. The rate may be corrected based on the timing of body processor 60. The at least one accelerometer may comprise a fine acceleration sensor 22. The fine acceleration sensor 22 may be configured to read accelerations during flight. The fine acceleration sensor 22 may be configured to read accelerations on the order of, for example, plus or minus 16G. The fine acceleration sensor 22 may be in communication with the body processor 60. The at least one accelerometer may comprise a shot and impact acceleration sensor 24. The shot and impact acceleration sensor 24 may be configured to read accelerations during projectile launch and/or projectile impact on a target. The shot and impact acceleration sensor 24 may be configured to read accelerations on the order of, for example, plus or minus 200G. The shot and impact acceleration sensor 24 may be in communication with the body processor 60. The at least one accelerometer may have an X axis aligned with an axis defined by an elongated body (e.g. 20). The elongated body (e.g. 20) may be adapted to align with an axis defined by an elongated arrow shaft (e.g. 4). The archery projectile facility 300 may comprise status indicators 56. The status indicators 56 may be in communication with the body processor 60. The status indicators 56 may be adapted to correspond to a plurality of states. The status indicators 56 may be presented through employment of at least one LED (e.g. 18). The archery projectile facility 300 may comprise a computer readable medium 46. The computer readable medium 46 may be in communication with the body processor 60. The archery projectile facility 300 may comprise an energy storage device 14. The energy storage device 14 may be in electrical communication with a power management facility 70. The power management facility 70 may comprise an energy storage monitor 72. The power management facility 70 may comprise a voltage regulator 74. The power management facility 70 may comprise an on board charger 76. The energy storage device 14 may be in electrical communication with the body processor 60. The energy storage device 14 may be in electrical communication with the body processor 60 through the power management facility 70. The archery projectile facility 300 may comprise a wireless charge coil 16. The wireless charge coil 16 may be in electrical communication with the power management facility 70. The wireless charge coil 16 may be in electrical communication with the energy storage device 14. The wireless charge coil 16 may be adapted to receive energy 34 wirelessly from a remote charger 36. The remote charger 36 may comprise a wireless charge coil 30. The remote charger 36 may comprise a power supply interface 32. The power supply interface 32 may comprise a USB port, a DC socket, a Lightning port, combinations thereof, and/or the like. The archery projectile facility 300 may comprise a receiver 80. The receiver 80 may comprise a wireless modem 86. The wireless modem 86 may be adapted to communicate with the transmitter 50 over network 28. The network 28 may, for example, comprise a Bluetooth connection, a ZigBee connection, a Wi-Fi network, or the like. The receiver 80 may comprise a receiver processor 82. The receiver processor 82 may be in communication with the wireless modem 86. The receiver 80 may comprise a storage facility 84. The storage facility 84 may be in communication with the receiver processor 82

Figure 4:
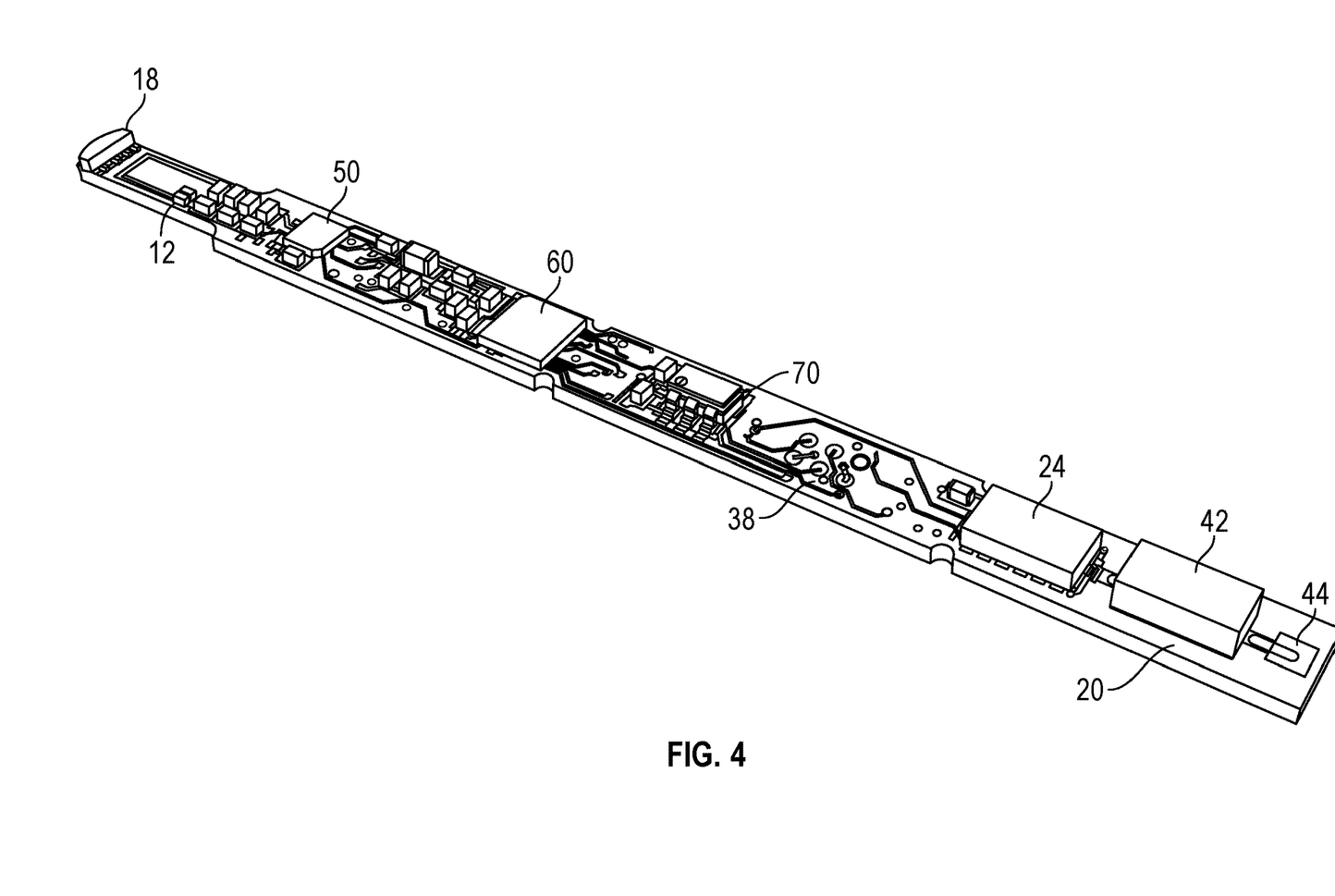
FIG. 4 schematically illustrates an example elongated body of an example archery projectile facility as per an aspect of an embodiment.

FIG. 4 schematically illustrates an example elongated body 20 of an example archery projectile facility as per an aspect of an embodiment. The elongated body 20 may comprise a printed circuit board. The printed circuit board may comprise a plurality of layers. The elongated body 20 may comprise at least one LED 18. The elongated body 20 may comprise a fine acceleration sensor. The fine acceleration sensor may be adapted to generate acceleration information on the elongated body 20. The elongated body 20 may comprise a shot and impact acceleration sensor 24. The shot and impact acceleration sensor 24 may be adapted to generate acceleration information on the elongated body 20. The elongated body 20 may comprise a body processor 60. The elongated body 20 may comprise a computer readable medium. The computer readable medium may comprise instructions. The computer readable medium may be adapted to store information generated by the fine acceleration sensor, the shot and impact acceleration sensor 24, the energy storage monitor (e.g. 72), the body processor 60, combinations thereof, and/or the like. The elongated body 20 may comprise a transmitter 50. The elongated body 20 may comprise an antenna 12. The antenna 12 may be in electrical communication with the transmitter 50. The elongated body 20 may comprise a charge and/or debug connector 38. The elongated body 20 may comprise a power switch 42. The elongated body 20 may comprise energy storage terminals 44. The elongated body 20 may comprise an oscillator. The elongated body 20 may comprise a power management facility 70. The power management facility 70 may comprise an energy storage monitor (e.g. 72). The energy storage monitor (e.g. 72) may be adapted to generate energy status information. The energy status information may comprise an indication of power remaining in an energy storage device (e.g. 14). The power management facility 70 may comprise a voltage regulator (e.g. 74).

Figure 5:
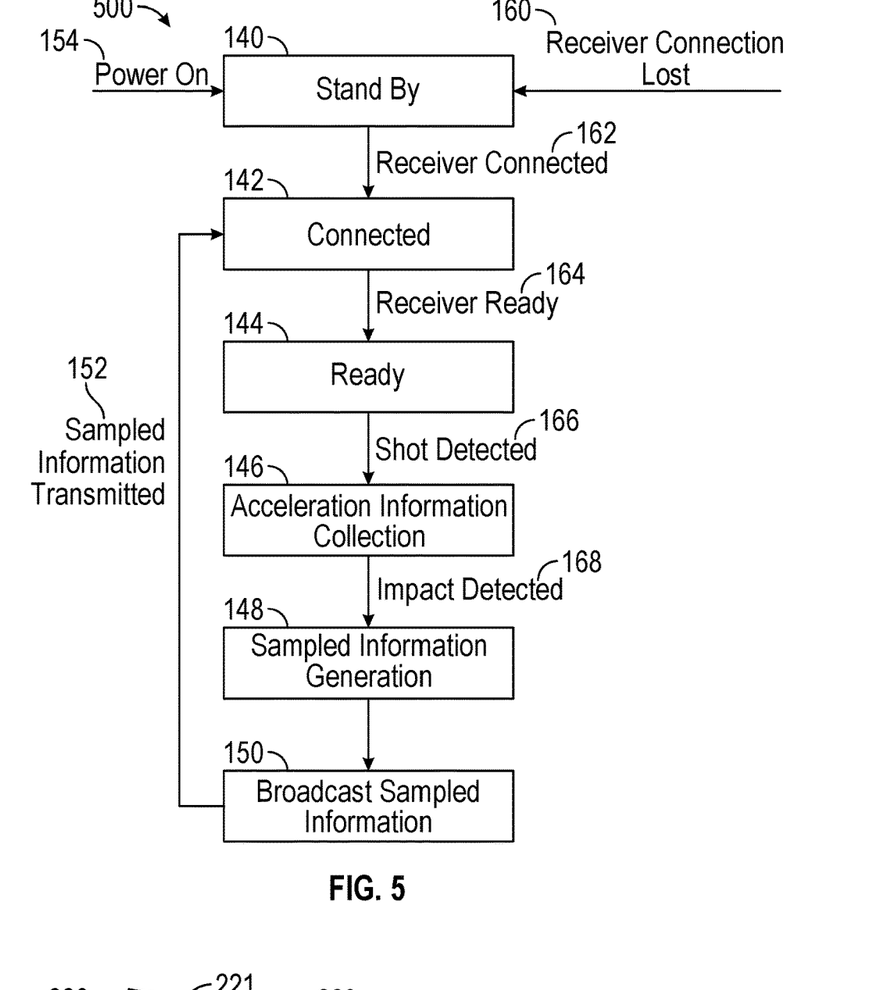
FIG. 5 is a state diagram for an example elongated body of an example archery projectile facility as per an aspect of an embodiment.

FIG. 5 is a state diagram for an example elongated body 500 of an example archery projectile facility as per an aspect of an embodiment. Upon a power on at 154, the elongated body 500 may be operable to stand by at 140. Upon a receiver being wirelessly connected at 162, the elongated body 500 may be operable to be connected at 142. Upon a receiver ready indication at 164, the elongated body 500 may be operable to be ready at 144. Upon a shot being detected at 166, the elongated body 500 may enter into acceleration information collection at 146. Upon an impact being detected at 168, the elongated body 500 may be operable to enter sampled information generation at 148. After sampled information is generated at 148, the elongated body 500 may be operable to broadcast sampled information at 150. Once sampled information has been transmitted at 152, the elongated body 500 may be operable to return to connected at 142. At any time during operation, if receiver connection is lost at 160, the elongated body 500 may be operable to return to stand by at 140.

Figure 6:
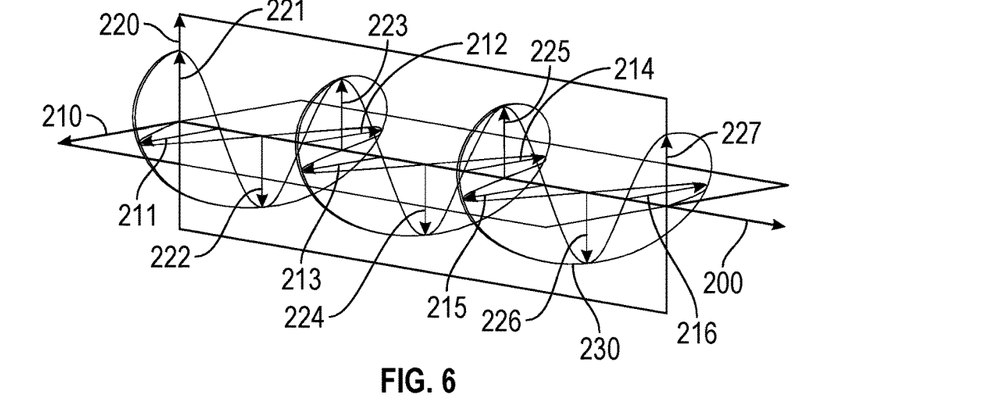
FIG. 6 illustrates an example three dimensional flight path of an archery projectile according to an aspect of an embodiment.

FIG. 6 illustrates an example three dimensional flight path 230 of an archery projectile according to an aspect of an embodiment. The three dimensional flight path 230 may be described via an X axis 200, a Y axis 210, and a Z axis 220. Three-dimensional acceleration information may be generated for the three dimensional flight path 230. The three-dimensional acceleration information may comprise instantaneous acceleration along the X axis 200. The three-dimensional acceleration information may comprise instantaneous acceleration along the Y axis 210. For example, Y axis instantaneous acceleration may comprise components 211, 212, 213, 214, 215, and 216. The three-dimensional acceleration information may comprise instantaneous acceleration along the Z axis 220. For example, Z axis instantaneous acceleration may comprise components 221, 222, 223, 224, 225, 226, and 227.

According to an embodiment, at least one accelerometer may be a three-axis transducer. The at least one accelerometer may be adapted to detect cyclical flexure of an elongated arrow shaft. The at least one accelerometer may be adapted to detect rotation (commonly referred to as spin) about a body axis defined by an elongated body. The at least one accelerometer may be adapted to detect wobble of an elongated arrow shaft. The at least one accelerometer may be adapted to detect fishtailing of an elongated arrow shaft. The at least one accelerometer may be operable to generate three-dimensional acceleration information. The three-dimensional acceleration information may be generated at a rate ranging between 50 and 3200 times per second.

According to an embodiment, resulting information may include velocity information. The velocity information may comprise an average velocity of an archery projectile during at least a portion of flight. The velocity information may comprise a maximum velocity. The velocity information may comprise a minimum velocity. The velocity information may comprise a velocity just prior to detection of an impact. The velocity information may comprise velocity at a specific time during flight. The velocity information may comprise velocity at a specific distance during flight. The resulting information may include distance information. The distance information may comprise a distance traveled by the archery projectile during flight. The resulting information may include angle information. The angle information may comprise an angle of the archery projectile during launch. The angle information may comprise an angle of the archery projectile during at least a portion of flight. The angle information may comprise an angle of the archery projectile after impact. The resulting information may include a time interval until the archery projectile reaches a stabilization point. The resulting information may include a flight distance until the archery projectile reaches the stabilization point. The resulting information may include a trauma score. The trauma score may be based on a loss of kinetic energy prior to the archery projectile reaching the stabilization point. The resulting information may include a flight score.

According to an embodiment, a receiver processor may be adapted to generate a first set of resulting information reflecting sampled information over a first time period of flight. The first set of resulting information may be generated for sampled information prior to the stabilization point. The receiver processor may be adapted to generate a second set of resulting information reflecting sampled information over a second time period of flight. The second set of resulting information may be generated for sampled information after the stabilization point. The first set of resulting information may be distinct from the second set of resulting information.

According to an embodiment, sampled information may be based on three-dimensional acceleration information. The three-dimensional acceleration information may comprise instantaneous acceleration in each of X, Y, and Z planes. Resulting information may be based on the sampled information. At least a portion of the resulting information may be based on determination of a stabilization point during a flight of an archery projectile. The stabilization point may be based on the sampled information.

According to an embodiment, instantaneous acceleration may be extracted from sampled information. For example, instantaneous acceleration in X,Y,Z $a[n]=(a_x[n], a_y[n], a_z[n])$, where $n \in (1, 2, 3, \ldots, N_t-1, N_t)$ is a sample of time, and $N_t$ is the total number of samples within a flight.

According to an embodiment, YZ acceleration may be converted into a complex number. For example, $s[n]=a_y[n]+j \cdot a_z[n]$ or $s[n]=a_z[n]+j \cdot a_y[n]$, where j is the square root of −1. The signal s[n] may be sliced into small time intervals. The small time intervals may have overlap between them. The slices may be expressed in a signal slice matrix.

Figure 7:
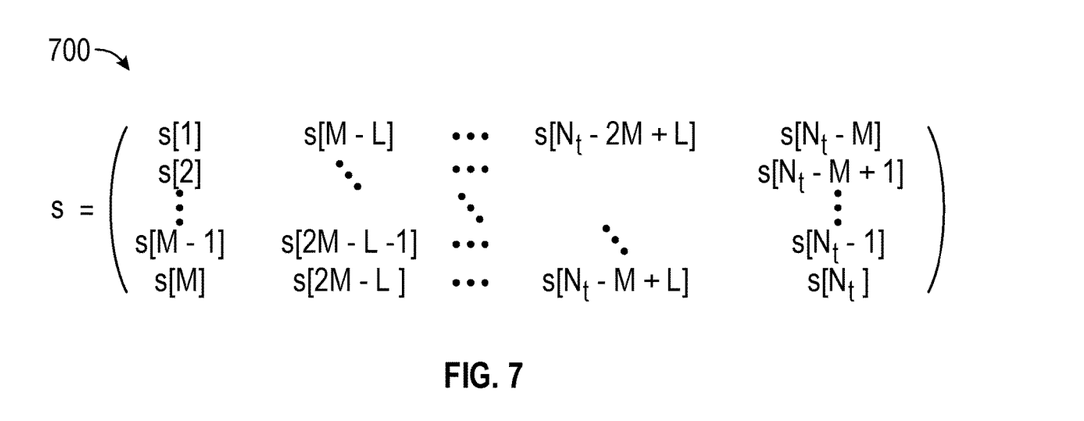
FIG. 7 illustrates an example signal slice matrix as employed in various embodiments.

FIG. 7 illustrates an example signal slice matrix 700 as employed in various embodiments. S represents the signal slice matrix of s [n] where $M<N_t$, $N_t$ is the number of samples per slice, L<M, and M is the number of samples considered for overlapping. For example, M may be equal to 120 samples. For example, L may be equal to 60 samples.

According to an embodiment, a transform may be applied to each of a plurality of slices of a signal. The transform may comprise a discrete Fourier transform (DFT). For example, a DFT may be applied to each of the plurality of slices in signal slice matrix S (e.g. 700) to generate a signal slice transform matrix $S_F=T_f S$, where $T_f$ is a transformation matrix.

Figure 8:
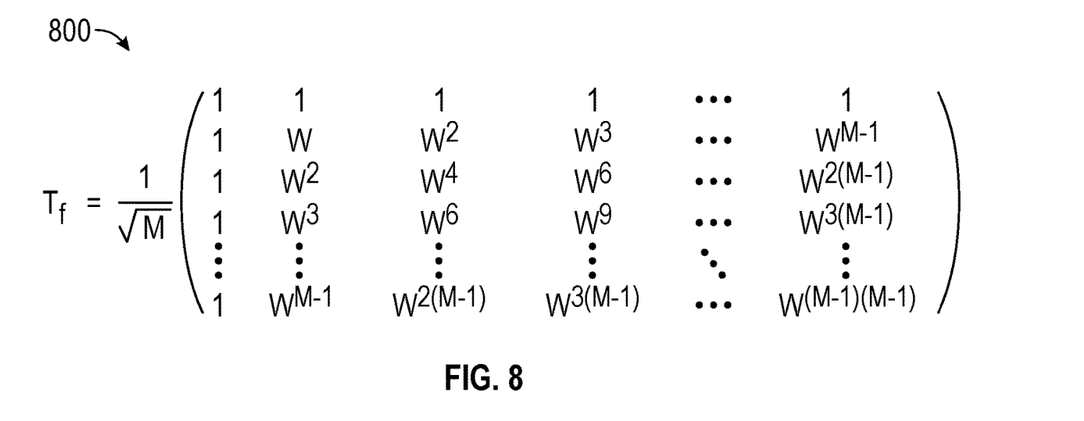
FIG. 8 illustrates an example transformation matrix as employed in various embodiments.

FIG. 8 illustrates an example transformation matrix 800 as employed in various embodiments. $T_f$ represents the transformation matrix where $w=\exp(-j2\pi/M)$. For example, when $T_f$ is applied to a signal slice matrix S (e.g. 700), each column of a resulting signal slice transform matrix $S_F$ contains the M point Fourier transform of s[n] within a period of M samples and an overlap of L samples. $N_t$, the total number of samples, may be divisible by M, the number of samples considered for overlapping. M, may be divisible by L.

According to an embodiment, the power of a signal slice transform matrix $S_F$ may be represented in logarithmic scale as $P_{SF}=20 \log|S_F|$.

According to an embodiment, a frequency threshold may be applied to a signal slice transform matrix $S_F$. The frequency threshold may be employed to determine which slices of signal slice transform matrix $S_F$ correspond to slices prior to a stabilization point. The frequency threshold may be employed to determine which slices of signal slice transform matrix $S_F$ correspond to slices after a stabilization point. The frequency threshold may comprise a frequency in a range of 200 to 500 Hz. For example, the frequency threshold may be equal to 300 Hz. In this example, slices in the signal slice transform matrix $S_F$ below 300 Hz may be discarded to calculate normalized power of signal slice transform matrix $S_F$. A power threshold may be applied to the normalized power of signal slice transform matrix $S_F$ to determine the stabilization point. The power threshold may comprise a range of −20 to −70 dB. For example, the power threshold may be equal to −65 dB. Since a first period of flight prior to stabilization is expected to have high vibrations, the first period of flight may be determined for slices above the power threshold. Since a second period of flight after stabilization is expected to have one dominant frequency, the second period of flight may be determined for slices below the power threshold. The end of the first period of flight may correspond to a time interval to the stabilization point.

According to an embodiment, kinetic energy may be determined for a first period of flight from a short time, for example 0.02 seconds, after launch to stabilization. The first period of flight may be referred to as T1. The kinetic energy may be determined for a second period of flight from stabilization to a short time, for example 0.02 seconds, prior to impact. The second period of flight may be referred to as T2. A trauma score may be a ratio of the kinetic energy over T2 to the kinetic energy over T1+T2. The kinetic energy may be based on an instantaneous modulus of velocity. The instantaneous modulus of velocity may be based on the velocity of an archery projectile.

Figure 9:
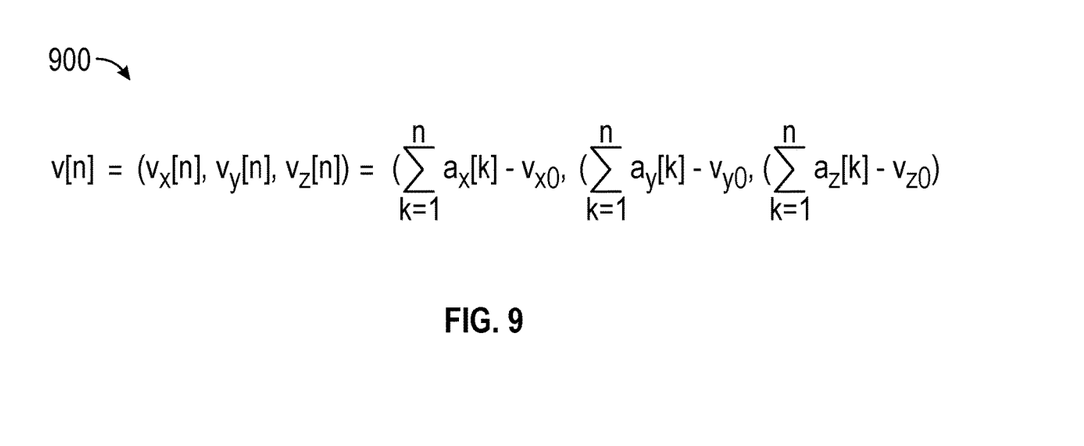
FIG. 9 illustrates an example equation for velocity as employed in various embodiments.

FIG. 9 illustrates an example equation 900 for velocity as employed in various embodiments. v[n] represents velocity where $v_{x0}$, $v_{y0}$ and $v_{z0}$ are constant values so that the final value of the velocity after the shoot is adjusted to 0.

Figure 10:
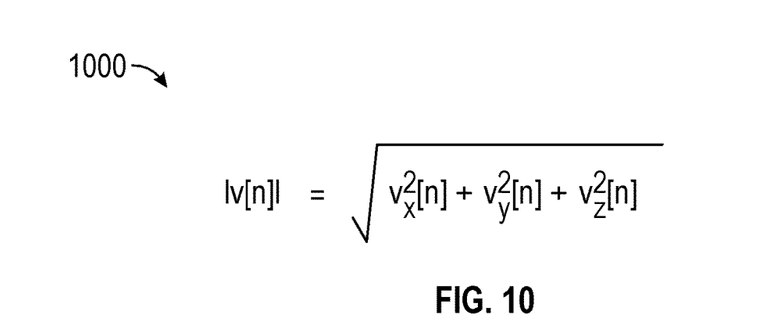
FIG. 10 illustrates an example equation for instantaneous modulus of velocity as employed in various embodiments.

FIG. 10 illustrates an example equation 1000 for instantaneous modulus of velocity as employed in various embodiments. |v[n]| represents the instantaneous modulus of velocity.

Figure 11:
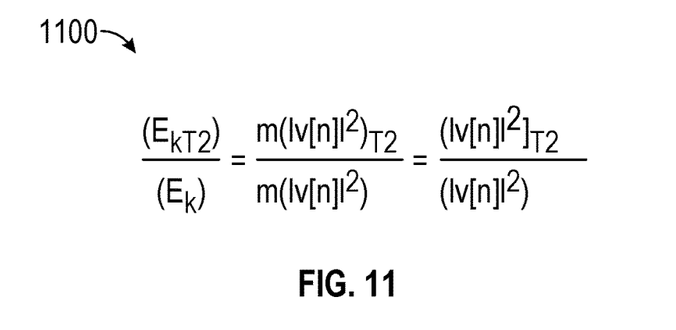
FIG. 11 illustrates an example ratio of kinetic energy for two distinct phases of flight as employed in various embodiments.

FIG. 11 illustrates an example ratio 1100 of kinetic energy for two distinct phases of flight as employed in various embodiments. The kinetic energy may be represented as $E_k[n]=m|v[n]|^2$ where m is the mass of an archery projectile. Therefore, the ratio 1100 represents the kinetic energy of T2 over the kinetic energy of T1+T2.

According to an embodiment, resulting information may comprise rotation information. The rotation information may be based on a period of flight. For example, rotation information for T2 may comprise a main vibration frequency of an archery projectile since the archery projectile has stabilized. In this example, the main vibration frequency may be equal to the rotation rate. The rotation rate for T2 may be calculated, for example, by applying a DFT of s [n] over T2 to determine normalized power. A power threshold may, for example, be set to 70 dB. The power component at 0 Hz may be discarded. The rotation rate may therefore be equal to the peak frequency of the remaining components.

According to an embodiment, instantaneous acceleration in XYZ a[n] may be extracted from sampled information. The instantaneous acceleration signal a[n] may be sliced into small time intervals. The small time intervals may have overlap between them. The slices may be expressed in an acceleration slice matrix.

Figure 12:
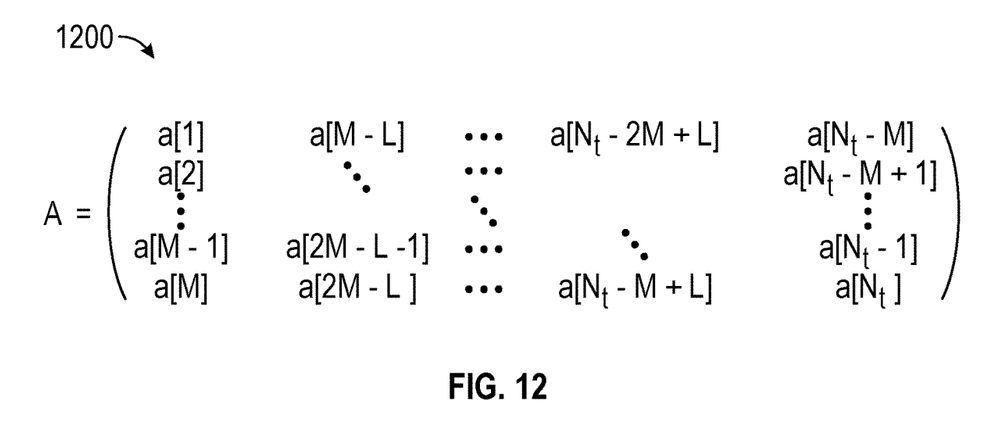
FIG. 12 illustrates an example acceleration slice matrix as employed in various embodiments.

FIG. 12 illustrates an example acceleration slice matrix 1200 as employed in various embodiments. A represents the acceleration slice matrix of a[n] where $M<N_t$, $N_t$ is the number of samples per slice, L<M, and M is the number of samples considered for overlapping. For example, M may be equal to 120 samples. For example, L may be equal to 60 samples.

According to an embodiment, a transform may be applied to each of a plurality of slices of a signal. The transform may comprise a discrete Karhunen-Loève transform (KLT). For example, a KLT may be applied to each column of slices in acceleration slice matrix A (e.g. 1200). A KLT may be performed by calculating a covariance matrix of each column of acceleration slice matrix A (e.g. 1200) and diagonalizing it. A dot product may be processed between resulting eigenvectors and the input slices. A KLT Matrix $A_{KLT}$ may be generated by applying the KLT to each column of slices in acceleration slice matrix A (e.g. 1200), where each column contains the M point KLT of a[n] within a period of M samples, and an overlap of L samples. $N_t$, the total number of samples, may be divisible by M, the number of samples considered for overlapping. M, may be divisible by L.

According to an embodiment, the power of a KLT Matrix $A_{KLT}$ may be represented in logarithmic scale as $P_{AK}=20 \log|A_{KLT}|$.

According to an embodiment, a power threshold may be applied to a normalized power of KLT Matrix $A_{KLT}$ to determine a stabilization point. The power threshold may comprise a range of −20 to −70 dB. For example, the power threshold may be equal to −20 dB. Since a first period of flight prior to stabilization is expected to have high vibrations, the first period of flight may be determined for slices above the power threshold. Since a second period of flight after stabilization is expected to have one dominant frequency, the second period of flight may be determined for slices below the power threshold. The end of the first period of flight may correspond to a time interval to the stabilization point.

According to an embodiment, a rotation rate for T2 may be calculated, for example, by applying a DFT of a[n] over T2 to determine normalized power. A power threshold may, for example, be set to 80 dB. The power component at 0 Hz may be discarded. The rotation rate may therefore be equal to the peak frequency of the remaining components.

Figure 13A:
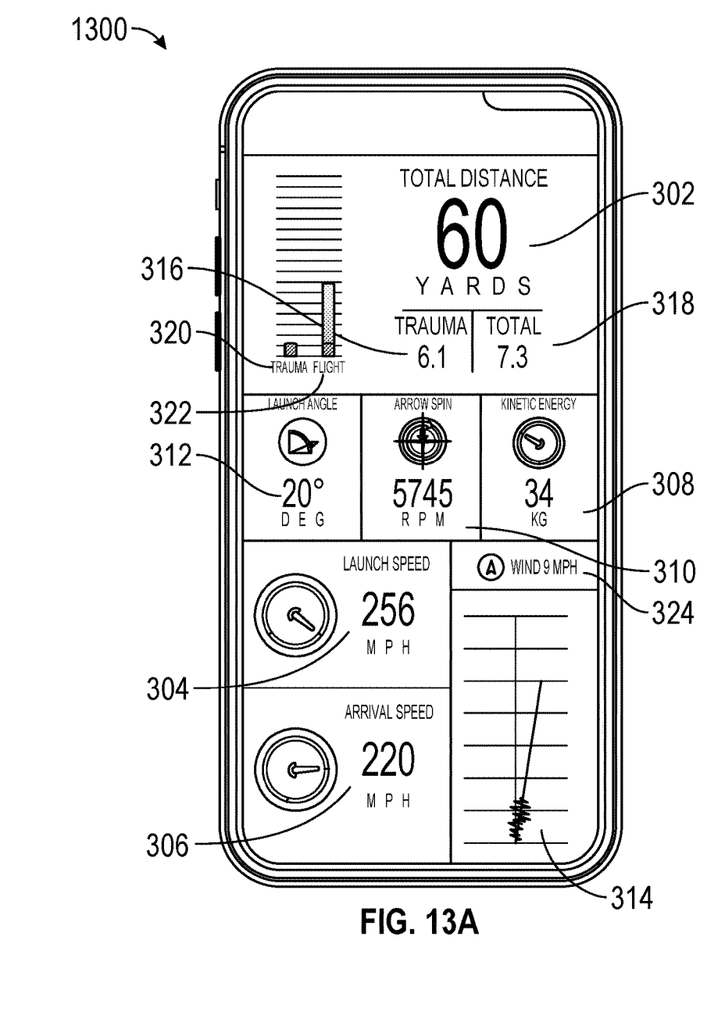
FIGS. 13A and 13B each illustrate an example display of an example receiver of an example archery projectile facility as per an aspect of an embodiment.
Figure 13B:
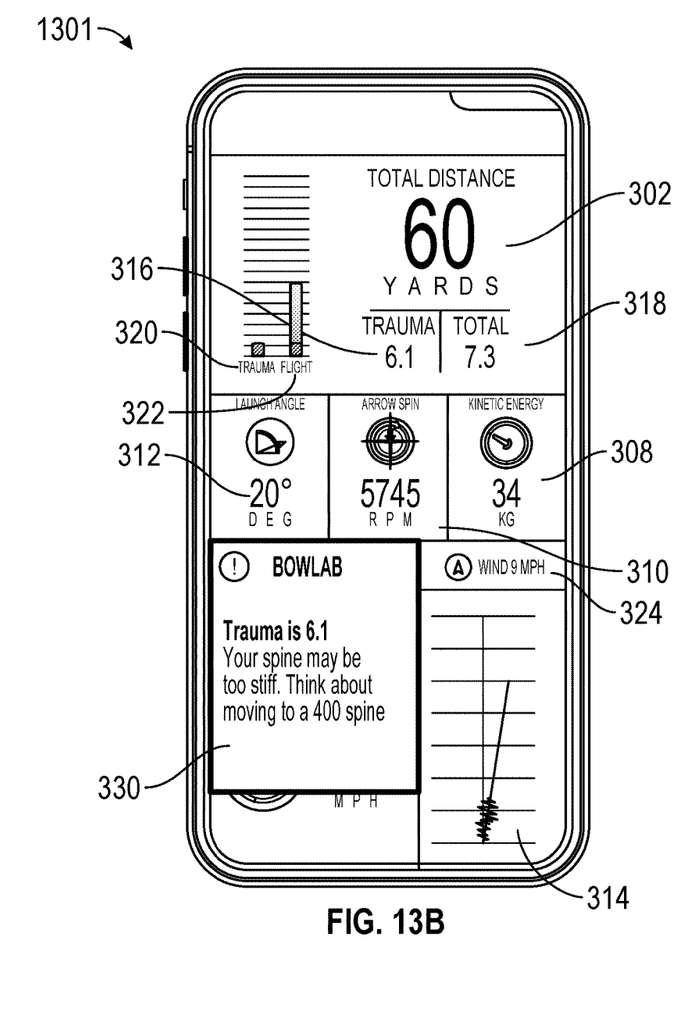

FIGS. 13A and 13B each illustrate an example display (1300 and 1301) of an example receiver of an example archery projectile facility as per an aspect of an embodiment. The display (1300 and 1301) may be in communication with a receiver processor. The display (1300 and 1301) may be configured to present resulting information. The display (1300 and 1301) may be configured to present performance information. The display (1300 and 1301) may be configured to present distance information 302. The display (1300 and 1301) may be configured to present velocity information at launch 304. The display (1300 and 1301) may be configured to present velocity information at impact 306. The display (1300 and 1301) may be configured to present kinetic energy information 308. The display (1300 and 1301) may be configured to present rotation information 310. The display (1300 and 1301) may be configured to present angle information 312. The display (1300 and 1301) may be configured to present flight path information 314. The flight path information 314 may comprise a three dimensional flight path. The display (1300 and 1301) may be configured to present trauma score information 316. The display (1300 and 1301) may be configured to present flight score information 318. The display (1300 and 1301) may be configured to present a graph of a trauma score 320. The display (1300 and 1301) may be configured to present a graph of a flight score 322. The display (1300 and 1301) may be configured to present wind information 324. The wind information 324 may comprise wind speed. The wind information 324 may comprise wind direction. The display (1300 and 1301) may be configured to present recommendation information 330. The recommendation information 330 may comprise at least one recommendation. The at least one recommendation may be based on resulting information. The at least one recommendation may be based on performance information.

Figure 14:
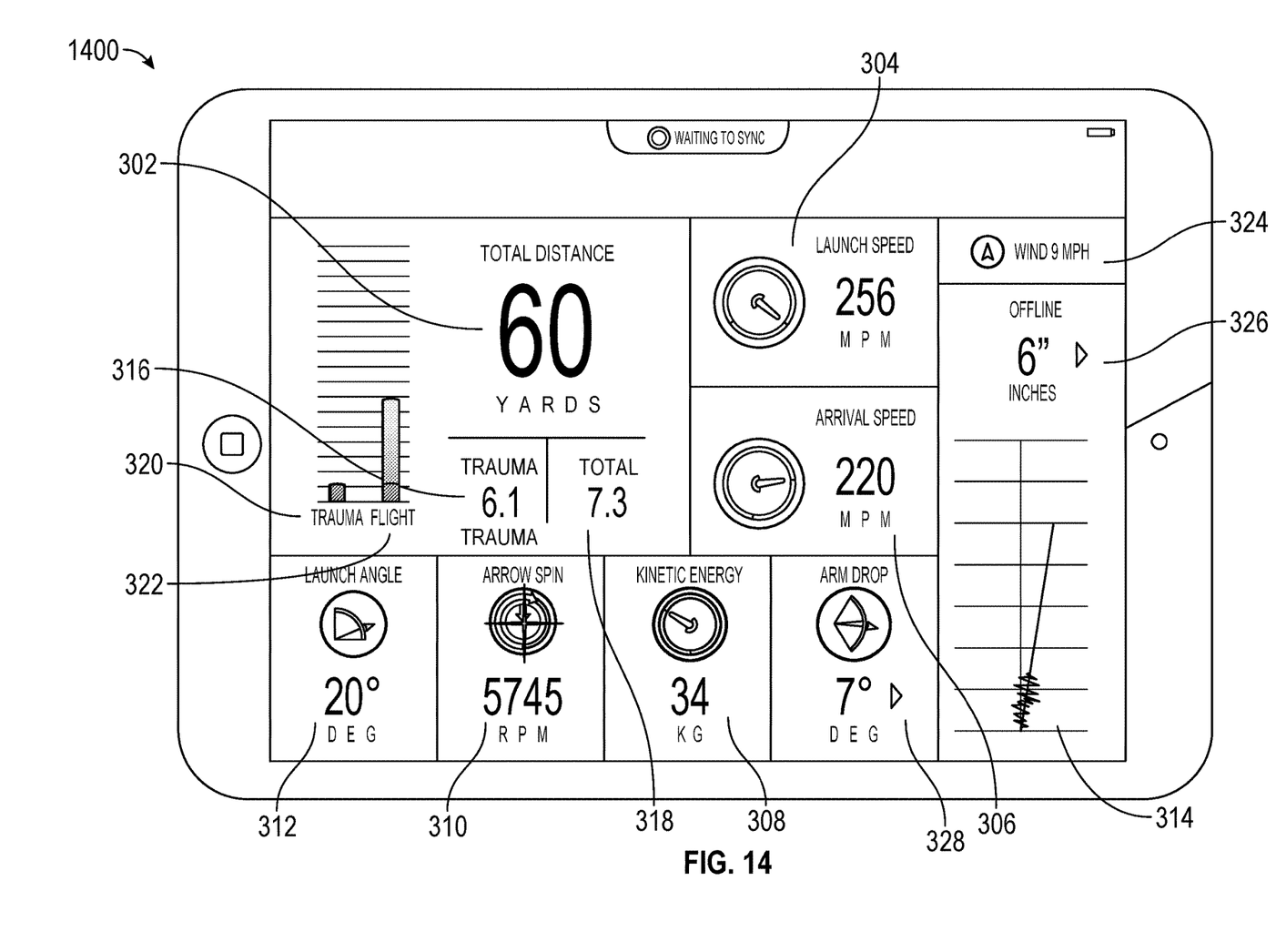
FIG. 14 illustrates an example display of an example receiver of an example archery projectile facility as per an aspect of an embodiment.

FIG. 14 illustrates an example display 1400 of an example receiver of an example archery projectile facility as per an aspect of an embodiment. The display 1400 may be in communication with a receiver processor. The display 1400 may be configured to present resulting information. The display 1400 may be configured to present performance information. The display 1400 may be configured to present distance information 302. The display 1400 may be configured to present velocity information at launch 304. The display 1400 may be configured to present velocity information at impact 306. The display 1400 may be configured to present kinetic energy information 308. The display 1400 may be configured to present rotation information 310. The display 1400 may be configured to present angle information 312. The display 1400 may be configured to present flight path information 314. The display 1400 may be configured to present trauma score information 316. The display 1400 may be configured to present flight score information 318. The display 1400 may be configured to present a graph of a trauma score 320. The display 1400 may be configured to present a graph of a flight score 322. The display 1400 may be configured to present wind information 324. The display 1400 may be configured to present offline information 326. The offline information 326 may be based on input from one or more bow sensors. The display 1400 may be configured to present arm drop information 328. The arm drop information 328 may be based on input from one or more bow sensors.

Figure 15:
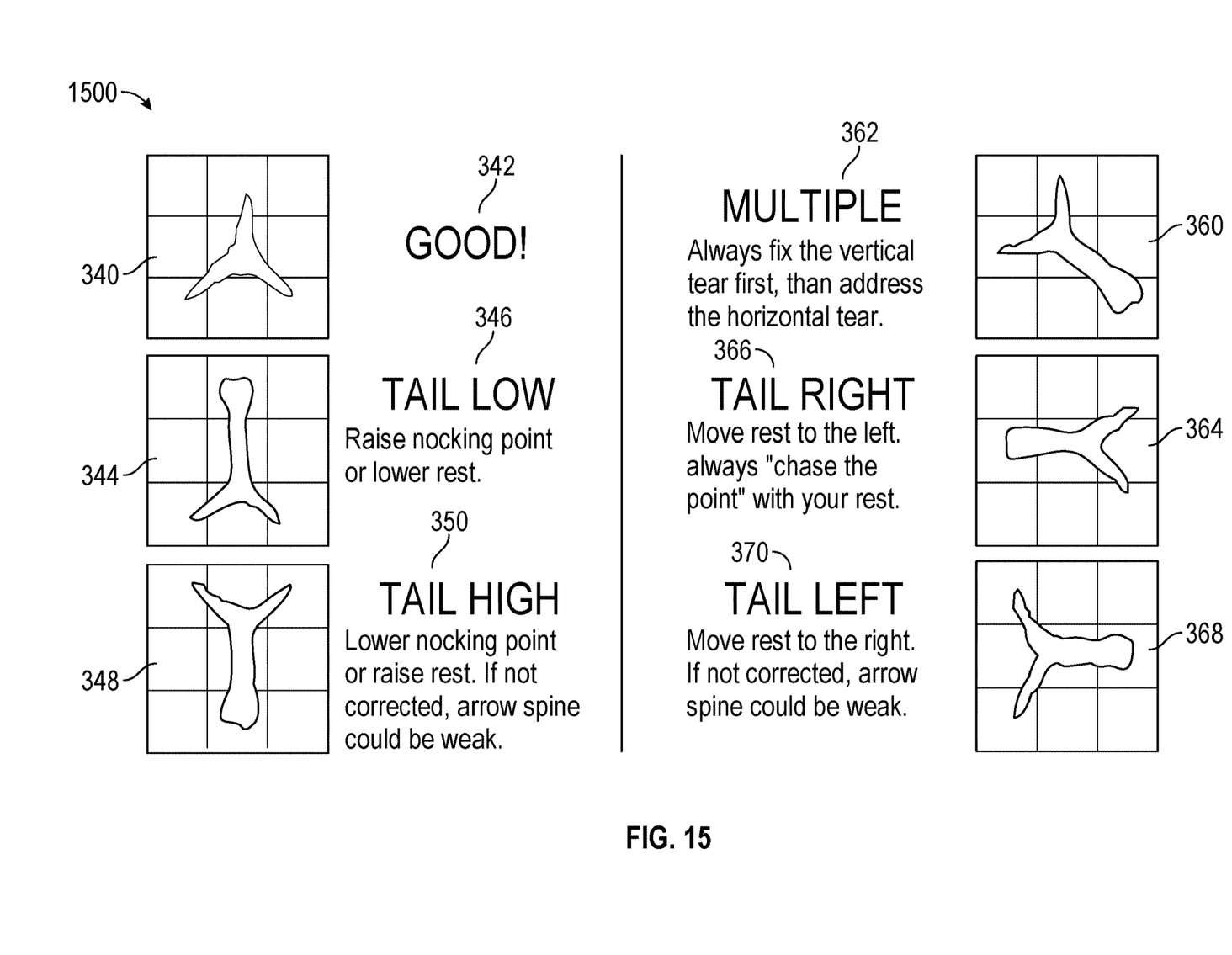
FIG. 15 illustrates example resulting information generated by an example receiver of an example archery projectile facility as per an aspect of an embodiment.

FIG. 15 illustrates example resulting information 1500 generated by an example receiver of an example archery projectile facility as per an aspect of an embodiment. The resulting information 1500 may comprise angle information (340, 344, 348, 360, 364, and 368). The resulting information 1500 may comprise at least one recommendation (342, 346, 350, 362, 366, and 370).

According to an embodiment, at least part of an archery projectile facility may be delivered to a user. Instructions may be communicated to the user. The instructions may instruct the user to install an elongated body of the archery projectile facility into one or more archery projectiles. The instructions may instruct the user to install at least one application on a receiver such as a smartphone, tablet, or other computing device. The instructions may instruct the user to shoot one or more archery projectiles one or more times with the elongated body installed. The instructions may instruct the user to communicate sampled information, resulting information, performance information, combinations thereof, and/or the like to a specific destination. The instructions may instruct the user to return at least part of an archery projectile facility to a specific destination. One or more recommendations may be communicated to the user.

Various embodiments have been presented. Each of these embodiments may of course include features from other embodiments presented, and embodiments not specifically described may include various features described herein.

A person of ordinary skill in the art will appreciate that components shown in and described with respect to the figures are provided by way of example only. Numerous other configurations are possible. Accordingly, embodiments of the present disclosure should not be construed as being limited to any particular configuration. It will be appreciated that while the disclosure may in certain instances describe a single example embodiment, there may be other configurations, shapes, and orientations of facilities and components without departing from example embodiments of the present disclosure. A person of ordinary skill in the art will recognize the applicability of embodiments of the present disclosure to various archery arrow shafts, bolts, broadheads, tips, fletching, bows, crossbows, and combinations thereof known in the art. A person of ordinary skill in the art may recognize that embodiments of the present disclosure may comprise fabricated, milled, printed, extruded, molded, combinations thereof, and/or the like parts comprising one material or a plurality of materials. A person of ordinary skill in the art will appreciate that components and elements shown in and described with respect to FIGS. 1-15 are provided by way of example only. Numerous other archery projectiles, bows, crossbows, receivers, microchips, and various archery and electrical component configurations are possible. Accordingly, embodiments of the present disclosure should not be construed as being limited to any particular archery projectile, bow, crossbow, or archery component. Additionally, it is to be recognized that, while the present disclosure has been described above in terms of various embodiments, it is not limited thereto. Various features, aspects, and/or components of the above described present disclosure may be used individually or jointly. Accordingly, the claims set forth below should be construed in view of the full breadth of the embodiments as disclosed herein.

In this specification, "a" and "an" and similar phrases are to be interpreted as "at least one" and "one or more." References to "a", "an", and "one" are not to be interpreted as "only one". References to "an" embodiment in this disclosure are not necessarily to the same embodiment.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a facility described as having three optional features may be embodied in seven different ways, namely with just one of the three possible features, with any two of the three possible features or with all three of the three possible features.

Further, the purpose of the Abstract of the Disclosure is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

We claim:

1. An archery projectile facility comprising:
a body;
the body including at least one accelerometer operable to generate three-dimensional acceleration information;
a body processor operably connected to the at least one accelerometer and adapted to process the three-dimensional acceleration information to generate sampled information;
a transmitter operably connected to the body processor to broadcast the sampled information;
a receiver remote from the body and adapted to receive the sampled information, the receiver including a receiver processor adapted to generate resulting information based on the sampled information, the resulting information based on a determination of a selected point;
wherein the receiver processor is adapted to generate a first set of resulting information reflecting the sampled information over a first time period of flight, and is adapted to generate a second set of resulting information reflecting the sampled information over a second time period of flight, the first set of resulting information distinct from the second set of resulting information; and
wherein the first set of resulting information is generated for sampled information prior to the selected point, and the second set of resulting information is generated for sampled information after the selected point.

2. The facility according to claim 1, wherein the body is adapted to be removably received in a hollow bore of an elongated arrow shaft.

3. The facility according to claim 2, wherein the body is adapted to be removably received in a rear end portion of the hollow bore proximate a nock.

4. The facility according to claim 2, wherein the at least one accelerometer is adapted to detect cyclical flexure of the elongated arrow shaft.

5. The facility according to claim 1, wherein the at least one accelerometer is a three-axis transducer.

6. The facility according to claim 1, wherein the resulting information includes velocity information.

7. The facility according to claim 1, wherein the resulting information includes distance information.

8. The facility according to claim 1, wherein the resulting information includes angle information.

9. The facility according to claim 1, wherein the resulting information includes a trauma score.

10. The facility according to claim 1, wherein the at least one accelerometer is adapted to detect rotation about a body axis defined by the body.

11. The facility according to claim 1, wherein the transmitter is adapted to transmit a plurality of sequential packets of the sampled information during a flight of the body.

12. The facility according to claim 1, wherein the three-dimensional acceleration information is generated at a rate ranging between 50 and 3200 times per second.

13. The facility according to claim 1, wherein the receiver includes a storage facility including stored data, and the receiver processor is adapted to generate performance information based on the resulting information and based on the stored data.

14. The facility according to claim 13, wherein the stored data includes at least one of arrow shaft mass for a plurality of arrow shafts, fletching mass for a plurality of fletchings, and arrow tip mass for a plurality of arrow tips.

15. The facility according to claim 13, wherein the performance information includes kinetic energy delivered to a target.

16. The facility according to claim 1, wherein resulting information includes a time interval until the selected point.

17. The facility according to claim 1, wherein resulting information includes a flight distance until the selected point.

18. The facility according to claim 1, including calculating kinetic energy lost at a selected point.

19. The facility according to claim 1 wherein determination of a selected point includes determining a first period of flight with high vibrations and a second period of flight with low vibrations.

20. An archery projectile facility comprising:
a body;
the body including at least one accelerometer operable to generate three-dimensional acceleration information;
a body processor operably connected to the at least one accelerometer and adapted to process the three-dimensional acceleration information to generate sampled information;
a transmitter operably connected to the body processor to broadcast the sampled information; and
a receiver remote from the body and adapted to receive the sampled information, the receiver including a receiver processor adapted to generate resulting information based on the sampled information, the resulting information based on a determination of a selected point defined by a transition between a first phase of flight between launch and stabilization, and a second phase of flight between stabilization to impact.

* * * * *